United States Patent
Perkins

(10) Patent No.: US 10,037,829 B2
(45) Date of Patent: Jul. 31, 2018

(54) MULTI-LEAF COLLIMATOR WITH LEAF SLIDING MEANS USING ROLLING ELEMENTS

(71) Applicant: Elekta AB, Stockholm (SE)

(72) Inventor: Clifford William Perkins, Crawley (GB)

(73) Assignee: ELEKTA AB, Stockholm (SE)

( * ) Notice: Subject to any disclaimer, the term of this patent is extended or adjusted under 35 U.S.C. 154(b) by 498 days.

(21) Appl. No.: 14/199,802

(22) Filed: Mar. 6, 2014

(65) Prior Publication Data
US 2014/0254768 A1  Sep. 11, 2014

(30) Foreign Application Priority Data

Mar. 7, 2013  (GB) .................................. 1304130.6

(51) Int. Cl.
*G21K 1/04*  (2006.01)
*F16C 29/06*  (2006.01)
*F16C 29/00*  (2006.01)

(52) U.S. Cl.
CPC .............. *G21K 1/046* (2013.01); *F16C 29/06* (2013.01); *F16C 29/008* (2013.01); *Y10T 74/19181* (2015.01)

(58) Field of Classification Search
None
See application file for complete search history.

(56) References Cited

U.S. PATENT DOCUMENTS

| 3,552,222 A | * | 1/1971 | Eck .......................... F16H 49/00 475/344 |
| 4,277,117 A | * | 7/1981 | George .................... F16C 19/20 384/520 |
| 4,283,246 A | * | 8/1981 | Held ........................ B27N 3/24 100/154 |
| 5,540,111 A | * | 7/1996 | Barnett ..................... B62M 1/24 280/252 |
| 7,386,099 B1 | * | 6/2008 | Kasper ..................... G21K 1/04 378/152 |
| 2001/0022868 A1 | * | 9/2001 | Teramach ............. F16C 29/008 384/45 |
| 2002/0101959 A1 | | 8/2002 | Kato et al. |
| 2003/0118256 A1 | * | 6/2003 | Ishihara ................ F16C 29/063 384/45 |

FOREIGN PATENT DOCUMENTS

| EP | 2 340 871 | 7/2011 |
| GB | 2 423 909 | 9/2006 |
| IN |    190191 A1 | * 6/2003 |

OTHER PUBLICATIONS http://www.mitcalc.com/doc/help/en/c_bearing_choice.htm, fetched from archive.org Mar. 19, 2006.*
Search Report dated Jun. 25, 2013 in British Application No. 1304130.6 (3 pages).

* cited by examiner

*Primary Examiner* — Wyatt Stoffa
*Assistant Examiner* — James Choi
(74) *Attorney, Agent, or Firm* — Finnegan, Henderson, Farabow, Garrett & Dunner LLP

(57) ABSTRACT

The leaves of a multi-leaf collimator can be driven more easily and hence more quickly if they are supported on a ball-race instead of in a sliding groove. A recirculating path is preferred, in which the rolling elements of the ball-race support the leaf over part of their path and then return to a start of the path. In addition, the rolling elements could be driven by a drive screw in order to drive the leaf.

8 Claims, 3 Drawing Sheets

MULTI-LEAF COLLIMATOR WITH LEAF SLIDING MEANS USING ROLLING ELEMENTS

CROSS-REFERENCE TO RELATED APPLICATIONS

This application claims priority to British Application No. 1304130.6 filed Mar. 7, 2013, which is incorporated herein by reference in its entirety.

FIELD OF THE INVENTION

The present invention relates to multi-leaf collimators. These are commonly used in radiotherapy apparatus in order to provide a variable and tailorable collimation to the x-ray beam.

BACKGROUND ART

Radiotherapy is a technique by which high-energy x-ray beams are directed towards a tumour or other lesion within a patient. These beams pass through the patient's anatomy and cause harm to the tissue making up the tumour. The beam is however also apt to cause damage to healthy tissue around the tumour, albeit at a lower rate, and thus efforts are made to limit this potential for damage.

One way of doing so is to direct the beam toward the tumour from a range of different directions. The result is that whereas the tumour (or some part of it) is in the beam continuously, the surrounding healthy tissue is only exposed for a shorter period, thus reducing the dose applied to that specific region. Typically, radiotherapy sources are therefore mounted on a rotatable gantry, directed toward the axis of rotation. The patient is then placed so that the tumour is at or near that axis, and the gantry is rotated continuously around the patient so that the tumour is irradiated from all possible directions.

Another way of limiting the dose applied to healthy tissue is to collimate the beam, i.e. place blocking elements in the beam path so as to limit its cross-sectional area. This can be used in a number of ways, either to limit the beam shape to the shape of the tumour (when viewed along the instantaneous direction of the beam) to produce a "rotational conformal arc therapy", or in more complex ways such as "intensity modulated arc therapy" which allows the gantry to rotate around the patient while the collimator shape and the dose rate are varied to build up a prescribed three-dimensional dose distribution in the patient. A discussion of these techniques is given in our earlier patent application WO2007/124760.

Such collimating techniques do however require a collimator that can define a variable and (typically) non-rectangular shape for the beam. Such a device is known as a "multi-leaf collimator", and an example is shown in EP0314214. It includes a number of adjacent "leaves", each of which is relatively deep in the beam direction (typically 10-15 cm) so as to provide the necessary attenuation of the beam, long in one dimension transverse to the beam (typically 30 cm or more), and narrow in their third dimension (typically a few mm). Arranged side-by side, each individual leaf can be driven forward and back along its long dimension so that the group of leaves as a whole defines an edge whose shape is variable at will. Typically, the leaves are supported along their long edges, located in guides having a corresponding shape. EP 0314214 shows the leaves being supported on rotatable wheels. They are driven by an electric motor positioned behind the rearmost edge of the leaf (to keep it out of the radiation field), driving a threaded rod that engages with a captive nut held in the leaf. As the rod rotates, the leaf is driven forward or back.

SUMMARY OF THE INVENTION

The present invention seeks to improve on existing designs of multi-leaf collimator "MLC"). Specifically, the invention aims to provide an MLC that is able to drive the leaves more quickly. At present, the MLC leaf speed is one of the limiting factors on the overall speed of the radiotherapy apparatus; increasing this could allow some treatments to be delivered more quickly, and could allow the gantry to rotate more quickly thereby assisting with combined radiotherapy/Computed Tomography arrangements.

The present invention therefore proposes that the leaf should be supported on a rolling-element bearing such as a ball race. Thus, the present invention provides a multi-leaf collimator for a radiotherapy apparatus, comprising a frame in which are housed a plurality of elongate leaves, the leaves being arranged side-by side and being individually moveable in their elongate directions, wherein each leaf is supported by the frame on a bearing comprising a plurality of rolling elements such that the rolling surfaces of the rolling elements contact at least a surface of the frame.

The rolling elements can be retained within a recirculating path, allowing them to move smoothly and support the leaf regardless of the extent of its movement. Ideally, the rolling elements support the edge of the leaf over a limited part of the recirculating path, with the remainder acting as a return path.

The rolling elements can be driven by a drive motor, thereby to drive the leaf and/or reduce the frictional resistance met by the rolling elements in the recirculating path. The drive motor preferably contacts the rolling elements at a part of the recirculating path located outside the limited part, thus spacing the driver motor from the leaf and assisting with the packaging of the necessary elements in what is often a limited volume. The leaf can then comprise formations extending from an edge supported by the bearing and shaped to engage with the rolling elements and be driven thereby; those formations can be formed integrally with the remainder of the leaf or be made up of parts engaging with the leaf.

The rolling surfaces of the rolling elements can also have a rolling contact with an edge of the leaf, thereby to define a true rolling-element bearing with the leaf being supported by a rolling motion only and without any need for sliding. The rolling elements may form part of a linear bearing, which is aligned with the elongate leaves so that the rolling elements are free to roll in the same direction as the leaf moves. This will considerably reduce the frictional resistance to movement of the leaf and allow the leaves to be safely moved much more quickly. At present, one limitation on the speed of leaf movement is the force which can be exerted on the leaf without buckling the drive screws; reducing the force necessary to overcome friction will therefore allow faster movement.

The rolling elements can be spherical or cylindrical in shape, or any other profile that allows a rolling action.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
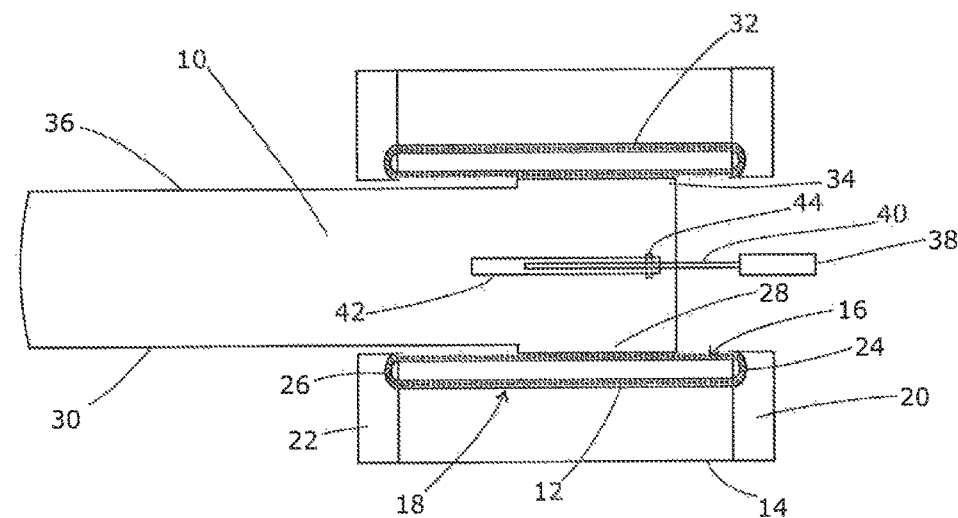
FIG. 1 shows a side view of a single leaf of a multi-leaf collimator according to an embodiment of the present invention.

FIG. 1 shows a side view of a single leaf 10 supported by a single ball 12 race set up as an undriven rolling-element bearing. Of course, a practical multi-leaf collimator will include many leaves (as its name suggests), arranged side-by-side and moveable independently back and forth (i.e. from left to right and vice-versa in FIG. 1). These can then act in concert to shape the beam in the manner described above. For clarity, the other leaves are omitted from FIG. 1.

The ball race is defined in a support structure 14 that includes an exposed open channel 16 allowing the leaf to rest on the ball race 12, and a return channel 18. End caps 20, 22 include U-shaped channels 24, 26 to connect the open channel 16 and the return channel 18 and thus define a complete recirculating path for the ball race 12. The leaf 12 includes a support section 28 that extends below the lower edge 30 of the remainder of the leaf 10, into the open channel 16 to rest on the exposed part of the ball race 12. The lower face of the support section 28 can be profiled to match the exposed balls of the ball race 12, if desired.

A corresponding arrangement is provided for the "upper" edge of the leaf 10, with a second ball race 32 contacting the leaf 10 via an upper support section 34 that extends above the upper edge 36 of the leaf 10. In this context, it should be borne in mind that the multi-leaf collimator containing the leaves will be mounted in a radiation head that is rotatable around the patient so as to deliver dose to the patient from all directions. Thus, at times the MLC may be in an inverted state. This means both that the references herein to "upper" and "lower" (etc.) apply only to the orientation of the leaf as illustrated, and also that in practice the leaf needs to be supported adequately regardless of its orientation.

The ball bearings of a ball race often have spacers or "cages" between them, such as small nylon disks or the like, which prevent adjacent balls from moving into contact with each other. The contacting faces would then be rotating in opposite directions, so by avoiding this the spacers or cages serve to reduce the frictional losses in the ball race still further.

This simple arrangement provides a greatly reduced resistance to motion of the leaf as compared with leaves sliding in grooves or on rotatable wheels. It means that even a conventional leaf drive arrangement will be able to move the leaf at a significantly higher speed than has previously been the case. Such drive arrangements usually comprise a drive motor 38 which rotates a threaded member 40 lying in the plane of the leaf 10, accommodated in a cut-out 42, A captive nut 44 is attached to the leaf in an engaging relationship with the threaded member 40 so that as the threaded member 40 rotates, the nut 44 is driven along the threaded member 40 taking the leaf 10 with it. The usual limitation on the speed at which this arrangement can drive the leaf is that the relatively long and thin threaded member 40 can buckle or whiplash if excessive forces are transmitted through it, causing the leaf or adjacent leaves to jam. Thus, by reducing the resistance to movement of the leaf, this embodiment reduces the forces placed on the threaded member 40 and increases the leaf speed at which buckling (etc.) becomes a risk.

Figure 2:
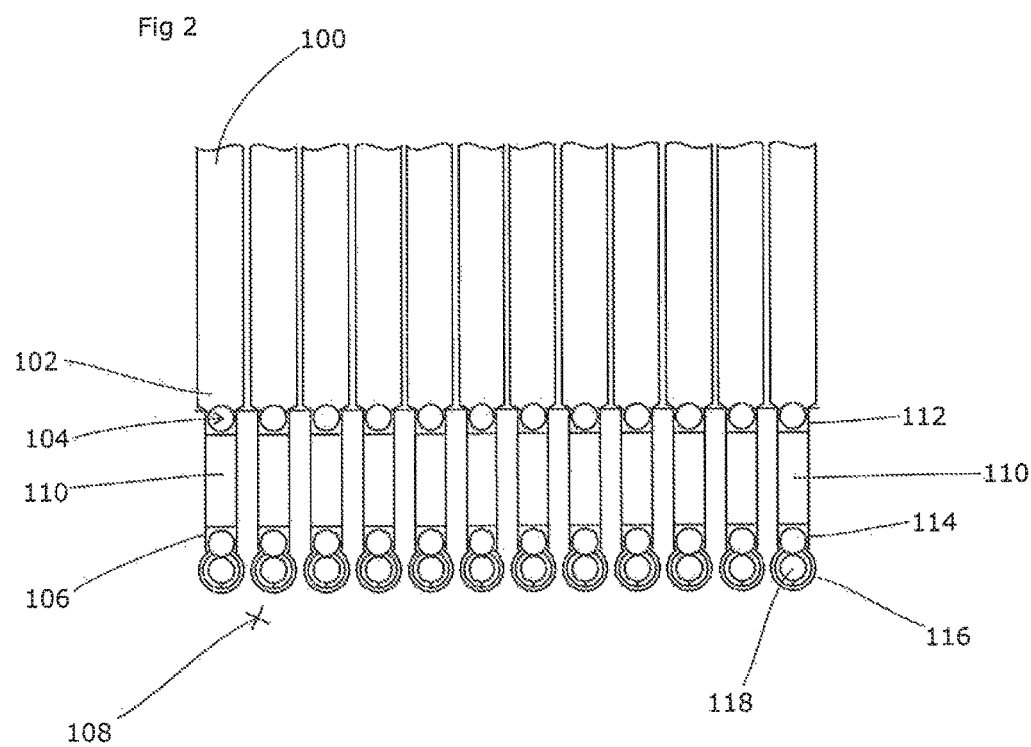
FIG. 2 shows an end view of a plurality of leaves according to a second embodiment.

An alternative drive method is shown in FIG. 2, which shows an end view of some of the leaves 100 making up a bank of leaves in the multi-leaf collimator. Each leaf 100 is supported at its lower edge 102 by a ball race 104 in the same manner as shown in FIG. 1; a deep notch 106 in the support structure 108 below each leaf 100 is partially filled by a block 110, leaving a space above and below the block to define the open channel 112 and the return channel 114 for the ball race 104. The leaves 100 rest on the balls of the ball race 104 that are in the open channel 112, and the lower edge 102 is appropriately profiled. As in FIG. 1, a corresponding arrangement is provided for the upper edges (not shown) of the leaves 100.

Along the base of each notch 106, there is a bore 116 which contains a threaded rod 118. The thread of the rod 118 is shaped and sized to match the size and spacing of the balls in the ball race 104, the location of the bore 116 places the rod 118 into a position engaging with the balls. Thus, when the rod is driven rotationally by a drive motor (not shown), this will drive the balls of the ball race 104 along the return channel 114 and (therefore) along the open channel 112. Buckling of the rod 118 is not a serious risk, as it is confined within the bore 116 which will support it.

This can be used in a number of ways. Where the leaves 100 are being driven by another means, such as the arrangement shown in FIG. 1, then the arrangement of FIG. 2 can be used to assist or encourage movement of the balls in the ball race 104 and thus reduce the rolling resistance of the race and ease still further the movement of the leaves 100. Alternatively, the arrangement of FIG. 2 can be the primary drive means for the leaves 100, causing the leaves to move. One way of assisting such movement is to provide the leaves with indentations along their lower edges, to engage with the ball race 104 by fitting the profile of the protruding ball tops. Another way takes advantage of the spacers or "cages" between the ball bearings of the ball race, where present (see above). Thus, a protrusion from the spacer could extend above the top surface of the ball race channel 112 and fit into an indentation in the bottom of the leaf or otherwise engage with or be connected to the leaf, meaning that the leaf will be driven along with the ball race.

To allow the ball race to complete its circulation as the leaf is driven back and forth, provision will need to be made to accommodate the protrusions. The channels thorough which the ball race circulates can be shaped to provide additional space for the protrusions, conflict with the drive rod 118 being avoided either by locating the drive rod to one side or by guiding the protrusions through a rotation of (say) 90°, or by a combination of an offset rod 118 and a (perhaps smaller) rotation. Alternatively, the protrusion can be attached to (or carried by) the leaf, if a deeper groove is cut into the end caps 20, 22 to allow the protrusion to exit with the leaf as the leaf moves forward.

Figure 3:
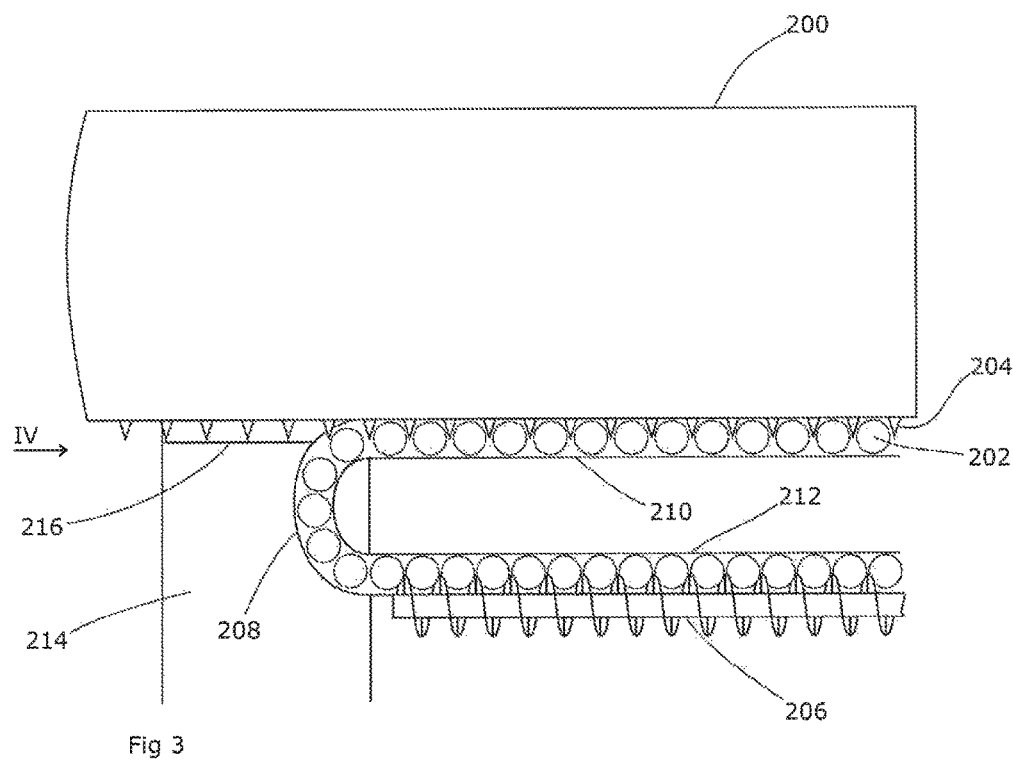
FIG. 3 shows a side view of a driven leaf according to a third embodiment of the present invention.
Figure 4:
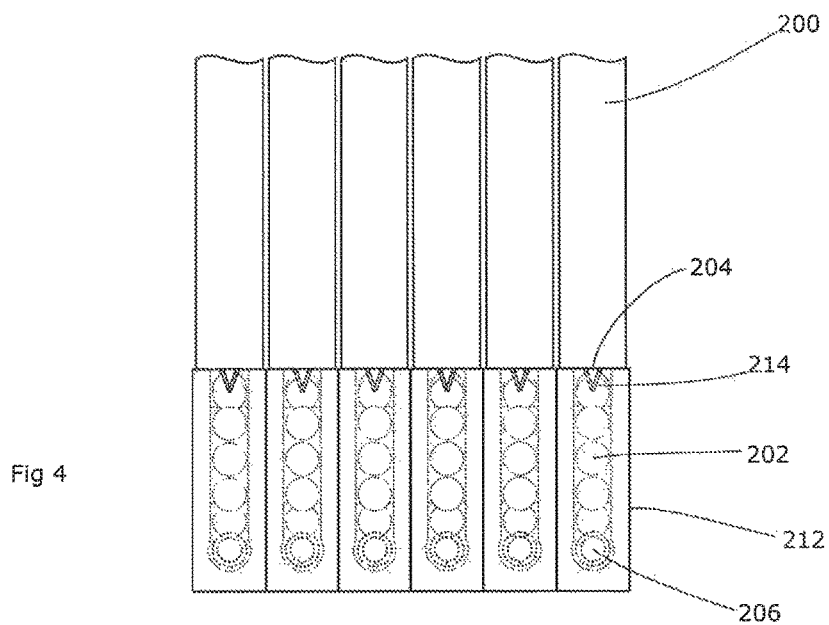
FIG. 4 shows an end view of a plurality of leaves according to the embodiment of FIG. 3, viewed along the direction of arrow IV in FIG. 3.

The simple arrangement of FIG. 1 does however limit the range of movement of the leaf 10/100 to a distance equal to the length of the exposed section of the ball race 12/104 less the length of the support section 28. Outside this range of movement, the support section 28 will strike the end caps 20, 22. This can be overcome as shown in FIGS. 3 and 4 by suitable profiling of the base of the leaf 10 and of the end caps 20, 22 instead of the support section 28. FIGS. 3 and 4 illustrate this principle in the context of a driven ball race in which the leaf includes elements projecting between each ball of the ball race 12, but it is equally applicable to undriven ball races or (more generally) ball races in which the leaf does not engage with the ball race.

Thus, the leaf 200 shown in FIGS. 3 and 4 rests on the ball race 202 and is driven by a series of teeth 204 integrally formed with the leaf and which extend into the gaps between adjacent balls of the ball race. These teeth 204 could be replaced with indentations on the lower edge of the leaf 200 or by protrusions extending upwardly from spacers between the balls, or by any other means of registering the leaf with the ball race, as noted above. The ball race 202 is (in turn) driven by a threaded rod 206 acting in the same manner as that of FIG. 2.

The channels for the ball race 202 are defined in the same manner as in FIG. 1, i.e. including a pair of end caps with return loop channels 208 to funnel the balls between the open channel 210 and the return channel 212. One such end cap 214 is shown in FIGS. 3 and 4. In this embodiment, the end caps have a groove 216 along their upper surfaces, facing the lower edge of the leaf 200, sized to allow the teeth 204 to pass through but not the balls of the ball race 202. The result is that as the leaf 200 moves back and forth, driven by interaction between the ball race 202 and the teeth 204, the teeth can pass through the groove 216 allowing smooth movement of the leaf 200. However, the balls of the ball race 202 are captured by the return loop channel 208 and directed to the return channel 212. This allows the leaf 200 to be substantially any length and to be moveable along its whole length subject only to having a part in contact with the open channel 210.

Figure 5:
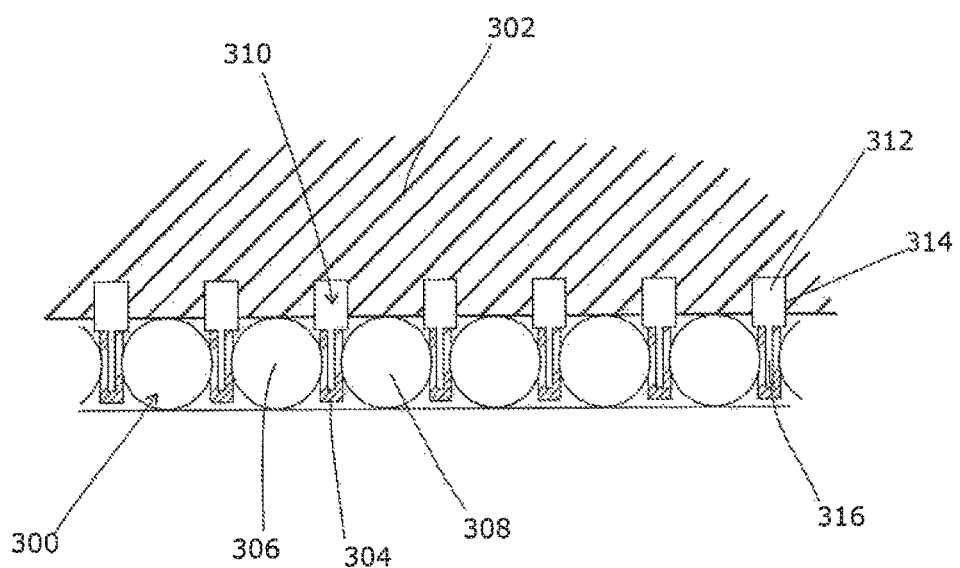
FIG. 5 shows an alternative means of engagement between the ball race and the leaf.

FIG. 5 shows the above-mentioned engagement between the ball race 300 and the leaf 302. A low-friction pad 304 is located between each adjacent pair of balls 306, 308 in the ball race 300; this is commonly done in order to reduce the frictional losses between the ball surfaces which will (obviously) be travelling in different directions at this point. According to this embodiment, a peg 310 extends from each pad 304 towards the leaf. Each peg 310 comprises a plug section 312 which fits into a corresponding recess 314 on the leaf 302, from which extends a pin 316 which locates in the centre of the pad 304 in order to assist in transferring forces from the ball race 300 to the leaf 302. Thus, as the ball race is driven back and forth, the pads 304 are taken with the ball race 300 and transmit the motion to the leaf 302 via the pegs 310. In practice, the pegs 310 can be fitted to the leaf 302 (or vice-versa), or they can be formed integrally therewith.

The low-friction pad 304 may be of a suitable material such as nylon, PEEK (Polyetheretherketone) or a PTFE (poly-tetrafluoroethylene) loaded material, or other low-friction material, or coated with such a low-friction material. PTFE is itself a low-friction material but is commonly regarded as having poor radiation resistance in its pure form.

It will of course be understood that many variations may be made to the above-described embodiment without departing from the scope of the present invention.

The invention claimed is:

1. A multi-leaf collimator for a radiotherapy apparatus, comprising:
   a plurality of leaves having an elongated shape; and
   a frame housing the plurality of leaves, the plurality of leaves being arranged side-by-side and being individually moveable in their elongate directions,
   wherein:
      the frame includes a pair of bearings located on opposite sides of at least one leaf to support the leaf, each bearing including a plurality of rolling elements retained within a retaining path located on the frame, wherein the retaining path is a recirculating path;
      the rolling elements in each bearing move in the elongate direction relative to the frame and with the at least one leaf;
      the rolling elements support an edge of the leaf over a limited part of the recirculating path; and
      the rolling elements are driven by a drive motor that contacts the rolling elements at a part of the recirculating path located outside the limited part.

2. The multi-leaf collimator according to claim 1, wherein the at least one leaf includes a plurality of formations extending from an edge of the leaf, the formations being supported by one of the pair of the bearings and shaped to engage the rolling elements and be driven thereby.

3. The multi-leaf collimator according to claim 2, wherein the formations engage the rolling elements by extending into a region between adjacent rolling elements.

4. The multi-leaf collimator according to claim 2, wherein the formations are formed integrally with the remainder of the leaf.

5. The multi-leaf collimator according to claim 1, wherein the rolling surfaces of the rolling elements are in contact with an edge of the leaf to define a rolling-element bearing.

6. The multi-leaf collimator according to claim 1, wherein the rolling elements are spherical.

7. The multi-leaf collimator according to claim 1, wherein the rolling elements are cylindrical.

8. A multi-leaf collimator for a radiotherapy apparatus, comprising:
   a plurality of leaves having an elongated shape; and
   a frame housing the plurality of leaves, the plurality of leaves being arranged side-by-side and being individually driven to move in their elongate directions,
   wherein:
      the frame includes a bearing supporting at least one leaf, the bearing including a plurality of rolling elements retained within a recirculating path located on the frame, wherein the rolling elements are driven by a drive motor to assist a movement of the leaf and wherein the rolling elements move, when driven, relative to the frame in the elongate direction of the corresponding leaf; and
      the drive motor contacts the rolling elements at a part of the recirculating path located outside a limited part over which the rolling elements support an edge of the leaf.

* * * * *